(12) United States Patent
Goodenough et al.

(10) Patent No.: US 9,890,048 B2
(45) Date of Patent: Feb. 13, 2018

(54) WATER SOLVATED GLASS/AMORPHOUS SOLID IONIC CONDUCTORS

(71) Applicants: Board of Regents, The University of Texas System, Austin, TX (US); Universidade Do Porto, Porto (PT); LNEG-LABORATORIO NACIONAL DE ENEGIA E GEOLOGIA, S. Mamede Infesta (PT)

(72) Inventors: John B. Goodenough, Austin, TX (US); Maria Helena Sousa Soares De Oliveira Braga, Porto (PT); Jose Jorge Do Amaral Ferreira, S. Mamede Infesta (PT); Preetam Singh, Austin, TX (US)

(73) Assignees: BOARD OF REGENTS, THE UNIVERSITY OF TEXAS SYSTEM, Austin, TX (US); UNIVERSIDADE DO PORTO, Porto (PT); LNEG-LABORATORIO NACIONAL DE ENEGIA E GEOLOGIA, S. Mamede Infesta (PT)

( * ) Notice: Subject to any disclaimer, the term of this patent is extended or adjusted under 35 U.S.C. 154(b) by 0 days.

(21) Appl. No.: 15/178,228

(22) Filed: Jun. 9, 2016

(65) Prior Publication Data
US 2016/0368777 A1    Dec. 22, 2016

Related U.S. Application Data

(60) Provisional application No. 62/181,606, filed on Jun. 18, 2015, provisional application No. 62/189,865, filed on Jul. 8, 2015.

(51) Int. Cl.
*H01G 9/02* (2006.01)
*C01B 33/32* (2006.01)
(Continued)

(52) U.S. Cl.
CPC .............. *C01B 33/32* (2013.01); *C01B 11/00* (2013.01); *C01B 25/306* (2013.01);
(Continued)

(58) Field of Classification Search
CPC ......................... H01M 4/364; H01M 10/0562
(Continued)

(56) References Cited

U.S. PATENT DOCUMENTS

| 4,307,163 A | 12/1981 | Joshi et al. |
| 2007/0003833 A1 | 1/2007 | Li et al. |

(Continued)

FOREIGN PATENT DOCUMENTS

| CA | 2940598 | 9/2015 |
| EP | 3111503 | 1/2017 |

(Continued)

OTHER PUBLICATIONS

International Search Report and Written Opinion received for PCT Patent Application No. PCT/US2016-036661, dated Nov. 30, 2016; 20 pages.

(Continued)

*Primary Examiner* — Khanh Tuan Nguyen
(74) *Attorney, Agent, or Firm* — Baker Botts L.L.P.

(57) ABSTRACT

The disclosure provides a water-solvated glass/amorphous solid that is an ionic conductor-an electronic insulator, and a dielectric as well as electrochemical devices and processes that use this material, such as batteries, including rechargeable batteries, fuel cells, capacitors, electrolysis cells, and electronic devices. The electrochemical devices and products use a combination of ionic and electronic conduction as well as internal electric dipoles.

16 Claims, 5 Drawing Sheets

(51) Int. Cl.
| | |
|---|---|
| H01G 11/56 | (2013.01) |
| H01M 8/124 | (2016.01) |
| H01M 10/0562 | (2010.01) |
| C01B 11/00 | (2006.01) |
| C01B 25/30 | (2006.01) |
| C01B 25/32 | (2006.01) |
| C01B 33/24 | (2006.01) |
| C01D 5/02 | (2006.01) |
| C01F 11/46 | (2006.01) |
| H01G 11/62 | (2013.01) |
| H01G 11/84 | (2013.01) |
| H01M 8/1016 | (2016.01) |
| H01M 10/36 | (2010.01) |
| C03C 1/00 | (2006.01) |
| C03C 4/18 | (2006.01) |

(52) U.S. Cl.
CPC .......... *C01B 25/322* (2013.01); *C01B 33/24* (2013.01); *C01D 5/02* (2013.01); *C01F 11/462* (2013.01); *C03C 1/006* (2013.01); *C03C 4/18* (2013.01); *H01G 11/56* (2013.01); *H01G 11/62* (2013.01); *H01G 11/84* (2013.01); *H01M 8/1016* (2013.01); *H01M 8/124* (2013.01); *H01M 10/0562* (2013.01); *H01M 10/36* (2013.01); *H01M 2300/008* (2013.01); *H01M 2300/0071* (2013.01); *Y02P 70/56* (2015.11)

(58) Field of Classification Search
USPC ................................. 252/62.2; 429/211, 323
See application file for complete search history.

(56) References Cited

U.S. PATENT DOCUMENTS

| | | | |
|---|---|---|---|
| 2007/0148553 A1 | 6/2007 | Weppner | |
| 2013/0202971 A1 | 8/2013 | Zhao et al. | |
| 2014/0113187 A1 | 4/2014 | Winoto et al. | |
| 2014/0141318 A1 | 5/2014 | Lee et al. | |
| 2014/0272564 A1* | 9/2014 | Holme .................. | H01M 4/364 429/211 |
| 2015/0364788 A1 | 12/2015 | Lu et al. | |
| 2016/0365602 A1 | 12/2016 | Sousa Soares De Oliveira Braga et al. | |

FOREIGN PATENT DOCUMENTS

| | | |
|---|---|---|
| KR | 20160142293 | 12/2016 |
| WO | 2012/112229 | 8/2012 |
| WO | 2013/077863 | 5/2013 |
| WO | 2016/026130 | 8/2014 |
| WO | 2015/128834 | 9/2015 |
| WO | 2016/142927 | 9/2016 |
| WO | 2016/157083 | 10/2016 |

OTHER PUBLICATIONS

Wang, Yonggang, et al. "Structural manipulation approaches towards enhanced sodium ionic conductivity in Na-rich antiperovskites." Journal of Power Sources 293, Jun. 10, 2015 (Jun. 10, 2015), pp. 735-740, XP055279752, CH ISSN: 0378-7753, DOI: 10.1016/j.jpowsour.2015.06.002 abstract; 6 pages.

Braga, M. Helena, et al. "Glass-amorphous alkali-ion solid electrolytes and their performance in symmetrical cells." Energy & Environmental Science, vol. 9, No. 3, Dec. 24, 2015 (Dec. 24, 2015), pp. 948-954, XP055300265, UK ISSN: 1754-5692, DOI: 10.1039/C5EE02924D abstract sections "Formation of dry glass/amorphous solids by water solvation", "Methods—Synthesis" and second paragraph of section "Results"; 7 pages.

Goodenough, John B. et al. "Solid Electrolytes in Rechargable Electrochemical Cells." Journal of the Electrochemical Society (Oct. 15, 2015); 22 pages.

Braga, M. H., et al. "Novel Li 3 ClO based glasses with superionic properties for lithium batteries." Journal of Materials Chemistry A 2.15 (Jan. 26, 2014): 5470-5480; 11 pages.

Mo, Yifei, Shyue Ping Ong, and Gerbrand Ceder. "First principles study of the Li10GeP2S12 lithium super ionic conductor material." Chemistry of Materials 24.1 (2012): 15-17; 3 pages.

Nagao, M., Hayashi, A., Tatsumisago, M. Fabrication of favorable interface between sulfide solid electrolyte and Li metal electrode for bulk-type solid-state Li/S battery, Electrochem. Commun. 22, 177 (2012); 4 pages.

Ong, S. P., Chevrier, V. L, Hautier, G., Jain, A., Moore, C, Kim, S., Ma, X. H., Ceder, G., "Voltage, Stability and Diffusion Barrier Differences Between Sodium-ion and Lithium-ion Intercalation Materials". Energy Environ. Sci., 4, 3680 (2011); 9 pages.

Palomares, Verónica, et al. "Na-ion batteries, recent advances and present challenges to become low cost energy storage systems." Energy & Environmental Science 5.3 (2012): 5884-5901; 18 pages.

Parlinski, K., Z. Q. Li, and Y. Kawazoe. "First-principles determination of the soft mode in cubic ZrO 2." Physical Review Letters 78.21 (1997): 4063; 4 pages.

PCT Patent Application No. PCT/US2017/041348 filed Jul. 10, 2017 by John B. Goodenough, et al; 22 pages.

Perdew, John P., and Yue Wang. "Accurate and simple analytic representation of the electron-gas correlation energy." Physical Review B 45.23 (1992): 13244; 6 pages.

Sakka, S., and J. D. Mackenzie. "Relation between apparent glass transition temperature and liquids temperature for inorganic glasses." Journal of Non-Crystalline Solids 6.2 (1971): 145-162; 12 pages.

Schwering, Georg, et al. "High Lithium Ionic Conductivity in the Lithium Halide Hydrates Li3-n (OHn) Cl ($0.83 \leq n \leq 2$) and Li3-n (OHn) Br ($1 \leq n \leq 2$) at Ambient Temperatures." ChemPhysChem 4.4 (2003): 343-348; 6 pages.

Shannon, Robert D. "Revised effective ionic radii and systematic studies of interatomic distances in halides and chalcogenides." Acta crystallographica section A: crystal physics, diffraction, theoretical and general crystallography 32.5 (1976): 751-767; 17 pages.

Song, H. K., Lee, K. T., Kim, M. G., Nazar, L. F., Cho, J., Recent progress in nanostructured cathode materials for lithium secondary batteries. Adv. Fund. Mater. 20, 3818 (2010); 17 pages.

Song, J. Y., Y. Y. Wang, and C. C. Wan. "Conductivity study of porous plasticized polymer electrolytes based on poly (vinylidene fluoride) a comparison with polypropylene separators." Journal of the Electrochemical Society 147.9 (2000): 3219-3225; 7 pages.

Song, W., Cao, X., Wu, Z., Chen, J., Huangfu, K., Wang, X., Huang, Y., Ji, X. A study into the extracted ion number for NASICON structured $Na_3V_2(PO_4)_3$ in sodium-ion batteries Phys. Chem. Chem. Phys. 16, 17681 (2014); 7 pages.

Stahlkopf, Karl (Jun. 2006). Taking Wind Mainstream. IEEE Spectrum, retrieved Mar. 21, 2015; 4 pages.

Stevens, D. A., Dahn J. R. High capacity anode materials for rechargeable sodium-ion batteries. J. Electrochem. Soc. 147, 1271 (2000); 3 pages.

Takada, Kazunori, Noboru Aotani, and Shigeo Kondo. "Electrochemical behaviors of Li+ ion conductor, Li 3 Po 4-Li 2 S-SiS 2." Journal of power sources 43.1 (1993): 135-141; 7 pages.

Tarascon, J.-M., Armand, M., Issues and challenges facing rechargeable lithium batteries. Nature 414, 359 (2001); 9 pages.

Tatsumisago, Masahiro, and Akitoshi Hayashi. "Superionic glasses and glass-ceramics in the Li 2 S—P 2 S 5 system for all-solid-state lithium secondary batteries." Solid State Ionics 225 (2012): 342-345; 4 pages.

U.S. Appl. No. 15/700,414, filed Sep. 11, 2017 by Maria Helena Sousa Soares de Oliveira Braga, et al.

U.S. Appl. No. 15/645,643, filed Jul. 10, 2017 by John B. Goodenough, et al.

Vlad, A. et al. Hybrid supercapacitor-battery materials for fast electrochemical charge storage. Sci. Rep. 4, 4315 (2014); 7 pages.

(56) References Cited

OTHER PUBLICATIONS

Walawalkar, R., Apt, J., Mancini, R. (2007). Economics of electric energy storage for energy arbitrage and regulation in New York. Energy Policy 35(4), 2558 (2007); 11 pages.

Wimmer, Erich, et al. "Temperature-dependent diffusion coefficients from ab initio computations: Hydrogen, deuterium, and tritium in nickel." Physical Review B 77.13 (2008): 134305; 12 pages.

Xie, J. et al. Preparation of three-dimensional hybrid nanostructure-encapsulated sulfur cathode for high-rate lithium sulfur batteries. J. Power Sources, 253, 55 (2014); 9 pages.

Yabuuchi, N ., Kubota, K., Dahbi, M., Komaba, S., Research Development on Sodium-Ion Batteries. Chem. Rev. 114, 11636 (2014); 47 pages.

Yao, H. et al. Improved lithium-sulfur batteries with a conductive coating on the separator to prevent the accumulation of inactive S-related species at the cathode-separator interface. Energy Environ. Sci. 7, 3381 (2014); 10 pages.

Zhang S. et al. Control of graphitization degree and defects of carbon blacks through ball-milling. RSC Adv. 4, 505 (2014); 5 pages.

Zhang, S. S. Liquid electrolyte lithium/sulfur battery: Fundamental chemistry, problems, and solutions. Power Sources, 231, 153 (2013); 10 pages.

Zhang, Yi, Yusheng Zhao, and Changfeng Chen. "Ab initio study of the stabilities of and mechanism of superionic transport in lithium-rich antiperovskites." Physical Review B 87.13 (2013): 134303; 8 pages.

Zhao, Yusheng, and Luke L. Daemen. "Superionic conductivity in lithium-rich anti-perovskites." Journal of the American Chemical Society 134.36 (2012): 15042-15047; 6 pages.

Zheng, S. et al. J. High Performance C/S Composite Cathodes with Conventional Carbonate-Based Electrolytes in Li-S Battery. Sci. Rep. 4, 4842 (2014); 7 pages.

"NRL's Sodium Sulfur Battery Experiment Flies Aboard STS-87." NRL's Sodium Sulfur Battery Experiment Flies Aboard STS-87—U.S. Naval Research Laboratory, www.nrl.navy.mil/media/news-releases/1997/nrls-sodium-sulffir-battery-experiment-flies-aboard-sts87/; 1 page, 1997.

Alcantara, R., Lavela, P., Ortiz, G. F., Tirado, J. L, Carbon Microspheres Obtained from Resorcinol-Formaldehyde as High-Capacity Electrodes for Sodium-Ion Batteries. Electrochem. Solid-Stote Lett, 8, A222 (2005); 4 pages.

Angell, C. Austin, et al. "Relaxation in glassforming liquids and amorphous solids." Journal of Applied Physics 88.6 (2000): 3113-3157; 45 pages.

Angell, C. Austin. "Dynamic processes in ionic glasses." Chemical Reviews 90.3 (1990): 523-542; 20 pages.

Auxer, W. The PB sodium sulfur cell for satellite battery applications. Proceedings of the International Power Sources Symposium, 32nd, Cherry Hill, NJ (Pennington, NJ: Electrochemical Society). A88-16601 04-44: 49-54. (1986); 7 pages.

BeauHD, "The Slashdot Interview with Lithium-Ion Battery Inventor John B. Goodenough." Posted Apr. 19, 2017, retrieved from <https://hardware.slashdot.org/story/17/04/19/016213/the-slashdot-interview-with-lithium-ion-battery-inventor-john-b-goodenough>; 36 pages.

Blöchl, Peter E. "Projector augmented-wave method." Physical review B 50.24 (1994): 17953; 27 pages.

Braga, M. H., et al. "Alternative strategy for a safe rechargeable battery." Energy & Environmental Science 10.1 (2017): 331-336; 6 pages.

Braga, M. Helena, et al. "The Role of Defects in Li 3 ClO Solid Electrolyte: Calculations and Experiments." MRS Online Proceedings Library Archive 1526 (2013); 5 pages.

Braga, M. Helena, et al. "Electric Dipoles and Ionic Conductivity in a Na+ Glass Electrolyte." Journal of the Electrochemical Society 164.2 (2017): A207-A213; 7 pages.

Bruce, P. G., "Electrochemical Publishing" Solid State Electrochemistry, Cambridge University Press, 1994; 1 page.

Chen, Zonghai, et al. "Multi-scale study of thermal stability of lithiated graphite." Energy & Environmental Science 4.10 (2011): 4023-4030; 8 pages.

Choi, Nam-Soon, et al. "Challenges facing lithium batteries and electrical double-layer capacitors." Angewandte Chemie International Edition 51.40 (2012): 9994-10024; 31 pages.

Christensen, M., et al. "H in $\alpha$-Zr and in zirconium hydrides: solubility, effect on dimensional changes, and the role of defects." Journal of Physics: Condensed Matter 27.2 (2014): 025402; 13 pages.

Conway, B.E., Transition from "supercapacitor" to "battery" behavior in electrochemical energy storage. J. Electrochem. Soc. 138, 1539 (1991); 10 pages.

Daemen L.L., "Novel anti-perovskite electrolytes for superionic lithium transport" [online], FU11 Annual Progress Report—laboratory directed research and development, Los Alamos National Library, Mar. 2012; 4 pages.

Doeff, Marca M., et al. "Electrochemical insertion of sodium into carbon." Journal of the Electrochemical Society 140.12 (1993): L169-L170; 2 pages.

Ellis, B. L., Nazar, L. F., Sodium and sodium-ion energy storage batteries. Curr. Opin. Solid State Mater. Sci. 16, 168 (2012); 10 pages.

Ghidiu, Michael, et al. "Conductive two-dimensional titanium carbide'clay'with high volumetric capacitance." Nature 516.7529 (2014): 78; 13 pages.

Goodenough, John B. "Changing Outlook for Rechargeable Batteries." (2017): 1132-1135; 4 pages.

Goodenough, John B. et al. "Review-Solid Electrolytes in Rechargable Electrochemical Cells." Journal of the Electrochemical Society (2015); 6 pages.

Goodenough, John B., and Kyu-Sung Park. "The Li-ion rechargeable battery: a perspective." Journal of the American Chemical Society 135.4 (2013): 1167-1176; 10 pages.

H. Mehrer, Diffusion in Solids Fundamentals, Methods, Materials, Diffusion-Controlled Processes, Springer Series in Solid-State Sciences, 1st edn, vol. 155, 2007; 645 pages.

Hartwig, P., A. Rabenau, and W. Weppner. "Lithium hydroxide halides: phase equilibria and ionic conductivities." Journal of the Less Common Metals 78.2 (1981): 227-233; 7 pages.

Hartwig, P., and W. Weppner. "Ionic conductivities of lithium-halide-based quaternary compounds." Solid State Ionics 3 (1981): 249-254; 6 pages.

Hayashi, Akitoshi, et al. "Characterization of Li 2 S—SiS 2—Li x MO y (M= Si, P, Ge) amorphous solid electrolytes prepared by melt-quenching and mechanical milling." Solid State Ionics 148.3 (2002): 381-389; 9 pages.

Hebb, Malcolm H. "Electrical conductivity of silver sulfide." The journal of chemical physics 20.1 (1952): 185-190; 6 pages.

Heimann, B., Classic and Advanced Ceramics: From Fundamentals to Applications. John Wiley & Sons, Apr. 16, 2010; 576 pages.

Heyd, Jochen, Gustavo E. Scuseria, and Matthias Ernzerhof. "Hybrid functionals based on a screened Coulomb potential." The Journal of Chemical Physics 118.18 (2003): 8207-8215; 9 pages.

Hong, S. Y., Kim, Y., Pa rk, Y., Choi, A., Choic, N.-S., Lee, K. T., Charge carriers in rechargeable batteries: Na ions vs. Li ions, Energy Environ. Sci. 6, 2067 (2013); 15 pages.

Hönnerscheid, Andreas, et al. "Die Kristallstrukturen der Hydroxyhalogenide Li4 (OH) 3Br und Li4 (OH) 3I." Zeitschrift für anorganische und allgemeine Chemie 629.2 (2003): 317-320; 4 pages.

Hsu, Jeremy. "Texas Town Installs a Monster Battery for Backup Power." Popular Science, Apr. 5, 2010, www.popsci.com/technology/article/2010-04/texas-town-turns-monster-battery-backup-power.

Inaguma, Yoshiyuki, et al. "High ionic conductivity in lithium lanthanum titanate." Solid State Communications 86.10 (1993): 689-693; 5 pages.

Ohara Inc., ">1)LICGC™AG-01." Ohara Inc.: Lithium-Ion Conducting Glass-Ceramics (LICGC) :Development Products, www.ohara-inc.co.jp/en/product/electronics/licgc.html; 2 pages, 2017.

International Preliminary Report on Patentability for PCT Patent Application No. PCT/IB2016/051451, dated Sep. 21, 2017; 7 pages.

(56) References Cited

OTHER PUBLICATIONS

International Preliminary Report on Patentability for PCT Patent Application No. PCT/IB2016/051776, dated Oct. 3, 2017; 8 pages.

International Search Report and Written Opinion received for PCT Patent Application No. PCT/US2017/041348, dated Aug. 17, 2017; 15 pages.

International Search Report and Written Opinion received for PCT Patent Application No. PCT/US2017/041382, dated Aug. 25, 2017; 12 pages.

ISO 11357-2: Plastics—Differential Scanning Calorimetry (DSC)—Part 2: Determination of glass transition temperature, 1999; 12 pages.

J.P. Hansen and I. R. McDonald, "Dynamics of Supercooled Liquids." Theory of Simple Liquids, Elsevier, 2006, 250-254; 10 pages.

Jayaprakash, N., Shen, J., Moganty, S. S., Corona, A., Archer, L. A. Porous Hollow Carbon@Sulfur Composites for High-Power Lithium-Sulfur Batteries. Angew. Chem. Int. Ed. 50, 5904 (2011); 5 pages.

Ji L.et al. Graphene Oxide as a Sulfur Immobilizer in High Performance Lithium/Sulfur Cells, JACS, 133, 18522 (2011); 4 pages.

Jung, H. Y., Karimi, M. B., Hahm, M. G., Ajayan, P. M., Jung, Y. J., Transparent, flexible supercapacitors from nano-engineered carbon films. Sci. Rep. 2, 773 (2012); 5 pages.

Kamaya, Noriaki, et al. "A lithium superionic conductor." Nature materials 10.9 (2011): 682; 5 pages.

Koenig, A. A., Rasmussen, J. R. Development of a high specific power sodium sulfur cell. Proceedings of the 34th International Power Sources Symposium, p. 30. doi:10.1109/IPSS.1990.145783, 1990; 4 pages.

Kondo, S., K. Takada, and Y. Yamamura. "New lithium ion conductors based on Li2S-SiS2 system." Solid State Ionics 53 (1992): 1183-1186; 4 pages.

Kresse, Georg, and Jürgen Furthmüller. "Efficient iterative schemes for ab initio total-energy calculations using a plane-wave basis set." Physical review B 54.16 (1996): 11169; 18 pages.

Lapp, Torben, Steen Skaarup, and Alan Hooper. "Ionic conductivity of pure and doped Li3N." Solid State Ionics 11.2 (1983): 97-103; 7 pages.

Li, H. B. et al. Amorphous nickel hydroxide nanospheres with ultrahigh capacitance and energy density as electrochemical pseudocapacitor materials. Nature Commun. 4, 1894 (2013); 8 pages.

Liu, D., et al. "Spinel materials for high-voltage cathodes in Li-ion batteries." Rsc Advances 4.1 (2014): 154-167; 14 pages.

Liu, Duay, J., Lane, T., Lee, S. B. Synthesis and characterization of Ru02/poly(3,4-ethylenedioxythiophene) composite nanotubes for supercapacitors. Phys. Chem. Chem. Phys. 12, 4309 (2010); 8 pages.

Liu, Zengcai, et al. "Anomalous high ionic conductivity of nanoporous β-Li3PS4." Journal of the American Chemical Society 135.3 (2013): 975-978; 4 pages.

Lu, S., Chen, Y., Wu, X., Wang, Z., Yang Li, Y. Three-Dimensional Sulfur/Graphene Multifunctional Hybrid Sponges for Lithium-Sulfur Batteries with Large Areal Mass Loading. Sci. Rep. 4, 4629 (2014); 4 pages.

Ma, G., A lithium anode protection guided highly-stable lithium-sulfur battery. Chem. Commun. 50, 14209 (2014); 4 pages.

Manthiram, Arumugam, et al. "Rechargeable lithium—sulfur batteries." Chemical reviews 114.23 (2014): 11751-11787; 37 pages.

Zhang, Jianzhong, et al. "High pressure-high temperature synthesis of lithium-rich Li 3 O (Cl, Br) and Li 3—x Ca x/2 OCl antiperovskite halides." Inorganic Chemistry Communications 48 (2014): 140-143.

* cited by examiner

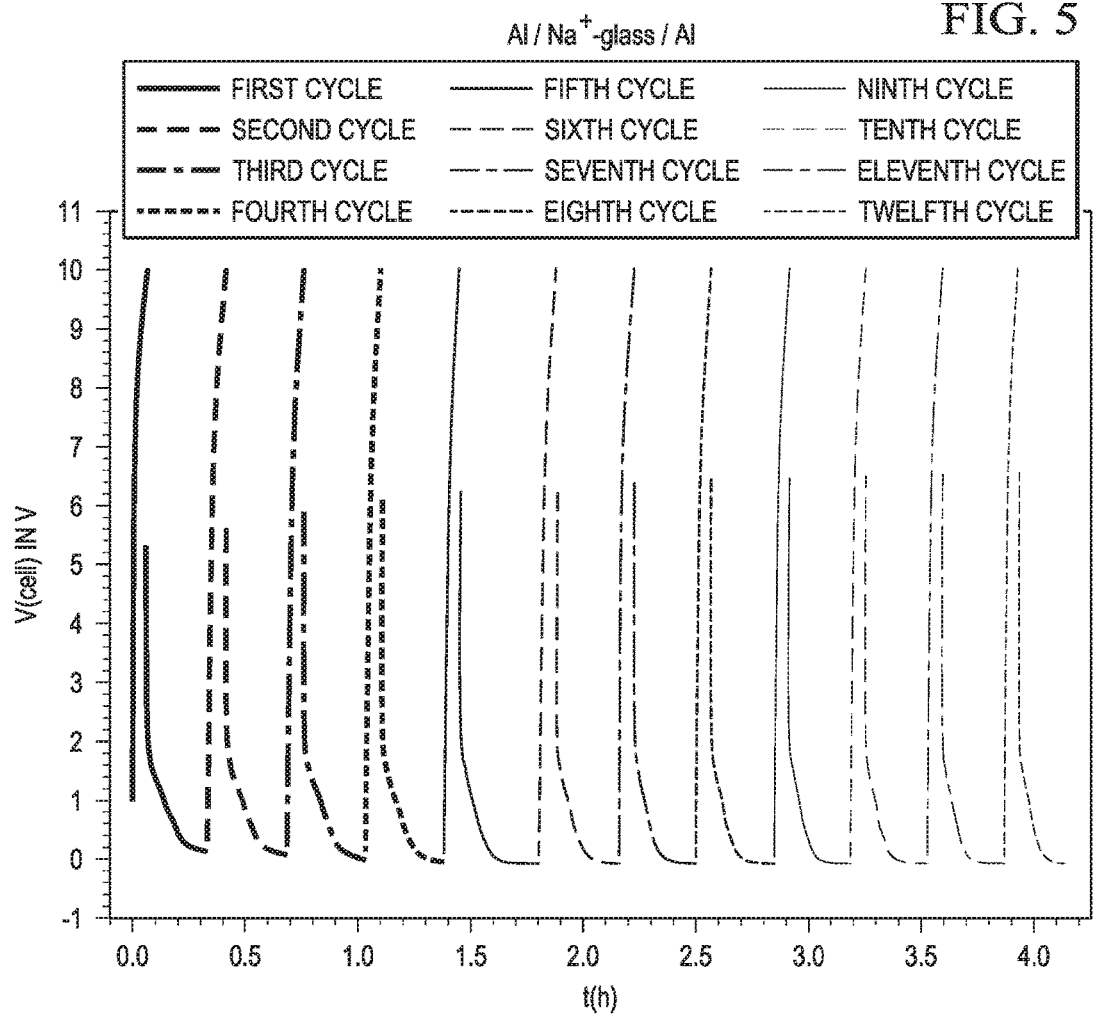

WATER SOLVATED GLASS/AMORPHOUS SOLID IONIC CONDUCTORS

PRIORITY CLAIM

The present application claims priority under 35 U.S.C. §119 to U.S. Provisional Patent Application Ser. No. 62/181,606 filed Jun. 18, 2015 and U.S. Provisional Patent Application Ser. No. 62/189,865 filed Jul. 8, 2015, the contents of which are incorporated by reference herein in their entirely.

TECHNICAL FIELD

The disclosure provides a dried, water-solvated glass/amorphous solid that is an alkali-ion conductor and an electronic insulator with a large dielectric constant. The disclosure also provides electrochemical devices and processes that use this material, such as batteries, including rechargeable batteries, fuel cells, capacitors, electrolytic generation of chemical products, including hydrogen gas ($H_2$), from water, and electronic devices. The electrochemical devices and products use a combination of ionic and electronic conduction. The disclosure also provides a water-solvated glass/amorphous solid that is a proton ($H^+$) conductor and an electronic insulator.

BACKGROUND

Ionic conductors that are also electronic insulators are called electrolytes; they may be a liquid or a solid. Electrolytes are used in a variety of electrochemical devices, including not only those that store electric power as chemical energy in a rechargeable battery or those that release chemical energy as electric power in a fuel cell, but also those that store electric power as static electric energy in an electric-double-layer capacitor. Electric power that is released from an electric-energy store, whether from a chemical or an electrostatic store, is clean energy. Chemical energy stored in a fuel that is released as the heat of combustion is a less efficient process, and combustion is also accompanied by the release of gases that pollute the air and contribute to global warming.

An electrochemical cell contains an electrolyte between two electrodes, an anode and a cathode. A liquid electrolyte requires use of a separator of the two electrodes that is permeable by the liquid electrolyte; the separator prevents electronic contact between the two electrodes within the cell. A solid electrolyte may serve as both an electrolyte and a separator. In a rechargeable battery, the anode is a reductant; in a fuel cell, the anode catalyzes the separation of a reductant fuel into its electronic and ionic components. In both types of cells, the ionic component of the chemical reaction between two electrodes is transported to the cathode inside the cell in the electrolyte, but the electrolyte forces the electronic component to go to the cathode via an external circuit as an electronic current I at a voltage V to provide electric power P=IV for performance of work. Since the ionic conductivity in the electrolyte is much smaller than the electronic conductivity in a good metal, battery cells and fuel cells are fabricated with large-area electrodes and a thin electrolyte; the active electrode materials are fabricated to make electronic contact with a metallic current collector for fast transport of electrons between the active electrode particles and the external circuit as well as ionic contact with the electrolyte that transports ions between the electrodes inside the cell.

Solid electrolytes with a large dielectric constant may also be used in electronic devices as separators of liquid or gaseous reactants as well as of solid reactants.

Liquids are generally much better ionic conductors at room temperature than most known solids, which is why liquids are normally used as the electrolyte of a room-temperature device. However, in some applications a solid electrolyte may be strongly preferred. For example, the Li-ion rechargeable battery uses a flammable organic liquid as the electrolyte, and a solid electrolyte would be safer and might be capable of improving the density of energy stored without sacrificing the rate of charge and discharge. Moreover, if the solid electrolyte also contains electric dipoles that give it a high dielectric constant, it can store much more electric energy than a liquid in an electric capacitance of an electric double layer of a metal/electrolyte interface.

In an electric-double-layer capacitor, metallic electrodes are fabricated so as to provide a maximum electrode/electrolyte interface. Ions in the electrolyte pin electrons or electron holes of opposite charge in the electrode across an electric double layer on charge. The separation of the electrons and holes across the double layer is small (atomic dimension) so the capacitance is large. On discharge, pinned electrons at the anode pass through the external circuit to recombine with the pinned electron holes in the cathode, and the mobile ions inside the electrolyte return to an equilibrium position. If the electrolyte has a large dielectric constant $\in'_r$, the capacitance of the electric double layer is enhanced. With a solid electrolyte having a large dielectric constant, the enhancement of the capacitance is large, and it becomes possible to construct a cell where the energy stored has a Faradaic component as in a battery and a capacitive component as in an electric-double-layer capacitor.

SUMMARY

The present disclosure includes a dried, water-solvated glass/amorphous solid electrolyte that conducts either $Li^+$ or $Na^+$, or both, nearly as rapidly as a flammable organic liquid at room temperature and also has a large dielectric constant. Moreover, alkali metals can be plated and stripped from/to it without dendrite formation, thus avoiding safety issues and a limited charge/discharge cycle life. A dried, water-solvated glass/amorphous solid that conducts $Li^+$ may be referred to herein as a "Li-glass." A dried, water-solvated glass/amorphous solid that conducts $Na^+$ may be referred to herein as a "Na-glass."

The present disclosure includes a water-solvated glass/amorphous solid electrolyte that conducts $H^+$ and may be referred to herein as a "proton electrolyte."

BRIEF DESCRIPTION OF THE DRAWINGS

A more complete understanding of the present embodiments and advantages thereof may be acquired by referring to the following description taken in conjunction with the accompanying drawings, which relate to embodiments of the present disclosure.

FIG. 5 is a graph showing the charge/discharge cycling of a capacitor formed by a thick, Li-glass electrolyte sandwiched between two aluminum plates.

DETAILED DESCRIPTION

Figure 1:
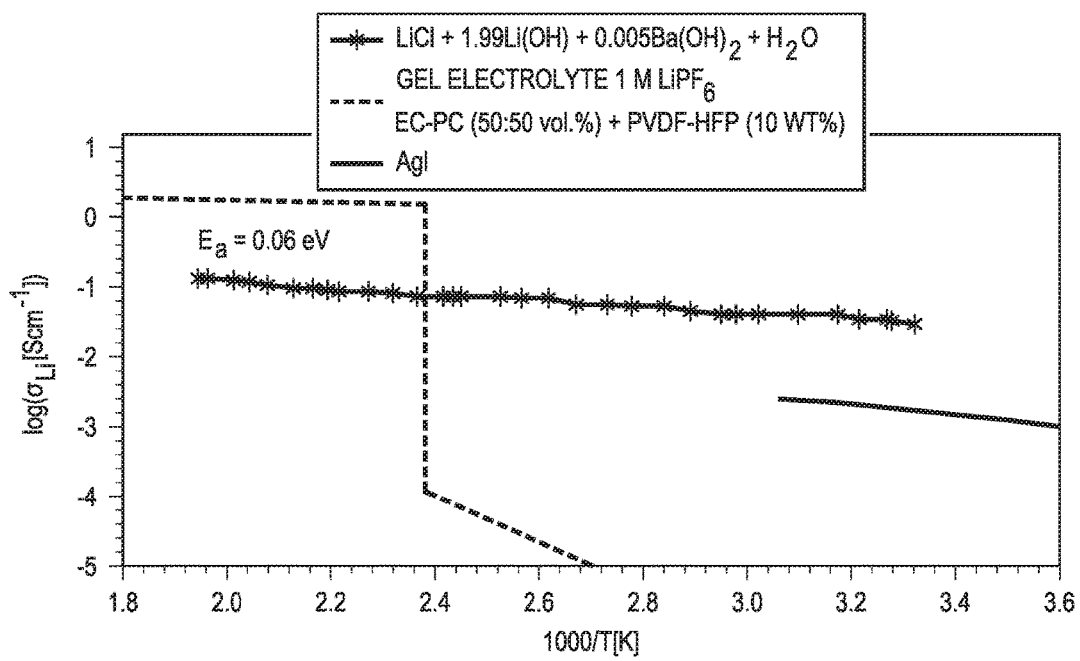
FIG. 1 is a graph comparing Arrhenius plots of Lithium-ion ($Li^+$) conductivity ($\sigma_{Li}$) versus temperature of a polymer gel with a salt, $LiPF_6$, and that of a Li-glass formed from precursor lithium hydroxides, LiOH, chlorides, LiCl and solvated water ($H_2O$); the solid was dried before measurement. The conductivity of AgI is also shown.

The present disclosure relates to a water-solvated glass/amorphous solid that conducts monovalent cations such as $Li^+$, $Na^+$, or $H^+$, and mixtures thereof, and is an electronic insulator. If the water-solvated glass/amorphous solid conducts $Li^+$, $Na^+$, or mixtures thereof, it is dried; an $H^+$ conductor is not dried. The Li-glass and Na-glass are excellent conductors of $Li^+$, $Na^+$ or mixtures thereof, and have high dielectric constants because of the presence of electric dipoles. They also have a large enough electronic-state energy gap not only to be excellent electronic insulators, but also to allow plating of alkali-metal anodes and the use of high-voltage cathodes in alkali-metal rechargeable batteries that contain the dried water-solvated glass/amorphous solid as the electrolyte or separator; electrochemical capacitors of high electrical-storage capacity can also be made with the Li-glass or Na-glass as the electrolyte. They are wet by the alkali metal to allow plating and stripping of alkali-metal anodes without dendrite formation, and they are capable of high-voltage storage of electrostatic energy at a glass/metal interface. The materials can be formed as a paste for facile application to a large surface area. They can be used as the electrolyte and/or separator of a battery, fuel cell, or electrolysis cell and/or as a material in a capacitor of an electronic device.

The disclosure also includes a method of forming the water-solvated glass/amorphous solid electrolyte from constituent precursors containing at least one alkali metal atom, particularly lithium (Li) and/or sodium (Na), with oxygen and/or at least one halide atom, particularly chlorine (Cl), bromine (Br), iodine (I), or mixtures thereof, and water ($H_2O$) added in an amount less than or equal to the solvation limit of the glass/amorphous product. For example, the constituent precursors of the glass/amorphous product may include $A_{3-x}H_xOX$, $AX+A_2O$, or $2AOH+AX$ ($H_2O$) with $x \leq 1$ where A is an alkali metal such as Li and/or sodium Na or a mixture thereof and X a halide atom. The constituent precursor may also contain an oxide or hydroxide promotor of glass formation such as $Ba(OH)_2$, $Sr(OH)_2$, BaO, SrO, CaO, MgO, $Al_2O_3$, $B_2O_3$, or $SiO_2$ and a promoter in which sulfur replaces the oxygen. An alternative is to press at an appropriate temperature the precursor oxide, hydroxide, halide, and any other additive, including $H_2O$, until it forms a glass.

In addition, the disclosure includes a method of drying the water-solvated glass/amorphous product. The method makes use of two chemical reactions. First, the reaction $H_2O+X^-=(OH)^-+HX\uparrow$, where HX evaporates as a gas, e.g. HCl, during heating to form the glass/amorphous product. Second, the reaction $2(OH)^-=O^{2-}+H_2O\uparrow$ exhausts steam (gaseous $H_2O$) below the decomposition temperature of the glass.

Excess alkali ions ($A^+$) can form three types of dipole to give a large dielectric constant: $OH^-$, $OA^-$, and $A^+$ in an asymmetric glass anion site. Orientation of the dipoles at higher temperatures, e.g. $50<T<110°$ C., in an ac or dc electric field before cooling to room temperature may be used to optimize more rapidly the cation conductivity at room temperature.

The disclosure also includes a method of fabricating the dried glass/amorphous product as a thin electrolyte in a cell where it separates two electrodes. The method includes breaking the glass/amorphous product into small pieces and an aprotic liquid, such as ethylene carbonate (EC), added to aid compaction of the powder into a dense film covering a current collector or an alkali metal anode that, on heating, reforms into a thin, dry glass/amorphous film with no grain boundaries.

Alternatively, the dry glass/amorphous product may be ground to small particles in an aprotic liquid such as ethanol to form a slurry or ink that can be applied as a thin layer over a large area of arbitrary shape; by a convenient method such as doctor-blading, printing, or vapor deposition. The cell ensemble is then sealed by a sealant such as Epoxy that cures exothermally and remains permeable to the evaporating gas from the liquid of the slurry while it is wet, but becomes impermeable as a solid sealant once it dries. Alternatively, the glass may be dried in a dry room. During evaporation of the liquid of the slurry, the glass/amorphous particles reform without grain boundaries into a continuous sheet as a Li-glass or Na-glass electrolyte having a large dielectric constant owing to the presence of electric dipoles.

The disclosure also includes a water-solvated glass/amorphous proton ($H^+$) electrolyte formed by solvating water into a crystalline solid containing a strongly electropositive cation such as a large alkali ion like that of potassium ($K^+$), rubidium ($Rb^+$), or cesium ($Cs^+$) and a strongly acidic polyanion such as $(SiO_4)^{4-}$, $(PO_4)^{3-}$, or $(SO_4)^{2-}$. The solvated water, $H_2O$, is captured by the strongly electropositive cations as an $(OH)^-$ ligand with the release of the $H^+$ ion, which is mobile in the presence of the solid polyanions. This process transforms the crystalline parent compound into a proton electrolyte.

The disclosure includes a water-solvated glass/amorphous solid produced by any of these methods.

The disclosure also relates to a paste including particles of a Li-glass or N-glass as described above in an organic liquid, an ionic liquid, and/or a polymer.

The disclosure further includes dielectric electrolytes-formed from a water-solvated glass/amorphous solid or paste as described above.

The disclosure additionally includes a method of forming a dielectric electrolyte by forming a paste as described above, applying the paste to a surface, and allowing some or all of the organic liquid, ionic liquid, and/or polymer to evaporate, leaving a reformed electrolyte dielectric. The disclosure includes the electrolyte-dielectric thus formed.

A water-solvated, dried glass/amorphous alkali-ion electrolyte having a large dielectric constant that may be used in an electrochemical cell that stores electric power as in a rechargeable battery, a cell that stores electric power as static electricity in the capacitances of an electric double layer at a metal/electrolyte interface, a cell that accomplishes both types of electric-power storage in the same cell, or a cell that is used in an electronic device.

Electrolyte/Dielectric Material

The water-solvated dried glass/amorphous solid may be formed from a crystalline electronic insulator or its constituent precursors (e.g. $LiCl+2Li(OH)+xBa(OH)_2.8H_2O$) by the addition of water ($H_2O$) up to the solubility limit of the crystalline electronic insulator. Water is solvated into the crystalline electronic insulator by separation of the hydroxide ($OH^-$) anion from the proton. Where this separation occurs, the solvated water acts like a salt dissolved in a liquid. The separation of the hydroxide anion and the proton may be stabilized by trapping the proton by an $X^-$ ion with the escape of HX gas; and mobile $OH^-$ ions may react with one another to form $H_2O$ that leaves the solid at higher temperature. The separation of the $H^+$ and $(OH)^-$ ions may also be achieved by the trapping of $OH^-$ anions at a large, strongly electropositive atom like $Ba^{2+}$, $K^+$, $Rb^+$, $Ca^+$ with the release of the $H^+$ ion to an acidic matrix.

If a halide ($X^-$) anion, such as a chloride ($Cl^-$) anion, a bromide ($Br^-$) anion, and/or an iodide ($I^-$) anion, is also present in the crystalline electronic insulator, the proton can combine with the $X^-$ anion and depart from the solid as a hydrogen halide (HX) gas, with the hydroxide anion remaining in the solid. The mobile $OH^-$ ions may react with one another to form $O^{2-}$ and $H_2O$ with the water leaving the solid at higher temperatures. The departure of the proton ($H^+$) and water from the water-solvated glass/amorphous solid means that the product is dry and can be used to contact an alkali-metal anode in a battery or in other electronic devices sensitive to the presence of water. If the hydroxide anions are not trapped in a hydrated polyanion such as $Ba(OH)_x^{(2-x)}$, they are mobile, as are any alkali cations, such as lithium ion ($Li^+$) and/or sodium ion ($Na^+$), of the-electronic insulator. The lithium ion ($Li^+$) and/or sodium ion ($Na^+$) are much more mobile than the $OH^-$ anions. Nevertheless, the mobile $(OH)^-$ ions may react as $2(OH)^-=O^{2-}+H_2O\uparrow$ with the escape of steam at higher temperatures.

Alternatively, if a large cation like the barium ion ($Ba^{2+}$) or potassium ion ($K^+$) rubidium ($Rb^+$), or cesium ($Cs^+$) is present in a crystalline electronic insulator, the hydroxide ($OH^-$) anion of the solvated water ($H_2O$) may be trapped in a-polyanion of the large cation and the proton ($H^+$) may be mobile if the other anion of the crystalline electronic insulator is a strongly acidic polyanion like phosphate $(PO_4)^{3-}$ or sulfate $(SO_4)^{2-}$. Most of the protons ($H^+$) are not trapped by the polyanions or in a hydrogen bond so long as the solvated water has transformed the crystalline electronic insulator into a water-solvated glass/amorphous solid.

The finished water-solvated glass/amorphous solid may be derived from any crystalline electronic insulator or its mix of oxide, hydroxide, and/or halide constituent precursors that can be transformed into a glass/amorphous solid by the solvation of water into it with or without the aid of an oxide, sulfide, or hydroxide additive. If the original crystalline material contains a large concentration of alkali ions bonded to oxide and/or halide ions, it may be transformed into a fast conductor of lithium ion ($Li^+$) and/or sodium ion ($Na^+$) and an electronic insulator by drying at high temperatures. If the crystalline electronic insulator contains only acidic polyanions and large, electropositive cations that stabilize hydroxide polyanions, transformation to a water-solvated glass/amorphous solid by the solvation of water provides a fast proton ($H^+$) conductor.

The water used to form a Li-glass or Na-glass may include less than two mole percent water and less than one mole percent of a glass-forming additive. The glass-forming additive may aid the transformation of the crystalline electronic insulator into a dried water-solvated glass/amorphous solid. The glass-forming additive may include at least one oxide, sulfide, and/or hydroxide, such as barium oxide (BaO), magnesium oxide (MgO), calcium oxide (CaO) and/or barium hydroxide $Ba(OH)_2$, $Mg(OH)_2$, $Ca(OH)_2$, $Sr(OH)_2$, or $Al(OH)_3$, BaO, SrO, CaO, MgO, Al, $B_2O_3$, $Al_2O_3$, $SiO_2$, S or $Li_2S$, and mixtures thereof. The water-solvated glass/amorphous solid has a glass transition temperature, $T_g$, that can be adjusted by the character of the cation that is introduced into the crystalline electronic insulator or its constituent precursor to promote glass formation. In addition, the hydroxide $(OH^-)^-$ anions of the dried water-solvated glass/amorphous solid or any other electric dipole like $(OH)^-$ or $(OA)^-$ where A=Li or Na, or an $A^+$ ion in an asymmetric glass site may be oriented in an ac or dc electric field to enhance the dielectric constants and the cation conductivity.

The water-solvated glass/amorphous solid may be ground into a plurality of small pieces and mixed with a polymer, an ionic liquid, and/or an organic liquids such as ethanol that evaporates quickly or ethylene carbonate (EC) in order to form a paste for easy application over a large surface area before reforming into a glassy amorphous solid. This process may improve contact with a solid electrode and/or current collector. Upon evaporation of some or all of the liquid component, the glass/amorphous solid is reformed as a large-volume ionic conductor with few, if any, grain boundaries. Evaporation may occur prior to inclusion in an electrochemical device or afterwards.

Two specific processes illustrate the transformation of the constituent precursor of a crystalline electronic insulator into a water-solvated glass/amorphous solid that is an ionic conductor and electronic insulator that is dry.

(1) The constituent precursor oxides, hydroxides, and halides of the crystalline electronic insulator may have the general formula $A_{3-x}{}^+H_x{}^+OX$, wherein $0 \leq x \leq 1$ and A is lithium (Li) and/or sodium (Na) and wherein X is chlorine (Cl), bromine (Br), and/or iodine (I). This starting material is rich in alkali ions bonded to only oxide and halide anions. Addition of water up to the solubility limit of the water with or without the addition of an oxide and/or hydroxide such as barium oxide (BaO), magnesium oxide (MgO), and/or barium hydroxide ($Ba(OH)_2$) transforms the crystalline electronic insulator or constituent precursor to a dry water-solvated glass/amorphous solid that is a lithium ion ($Li^+$) and/or sodium ion ($Na^+$) ionic conductor that remains an electronic insulator. The glass transition temperature decreases with an increase of the size of the cation of the added oxide and/or hydroxide; with the barium ion ($Ba^{2+}$) and lithium ion ($Li^+$), a $T_g \approx 55°$ C. is obtained.

Figure 3:
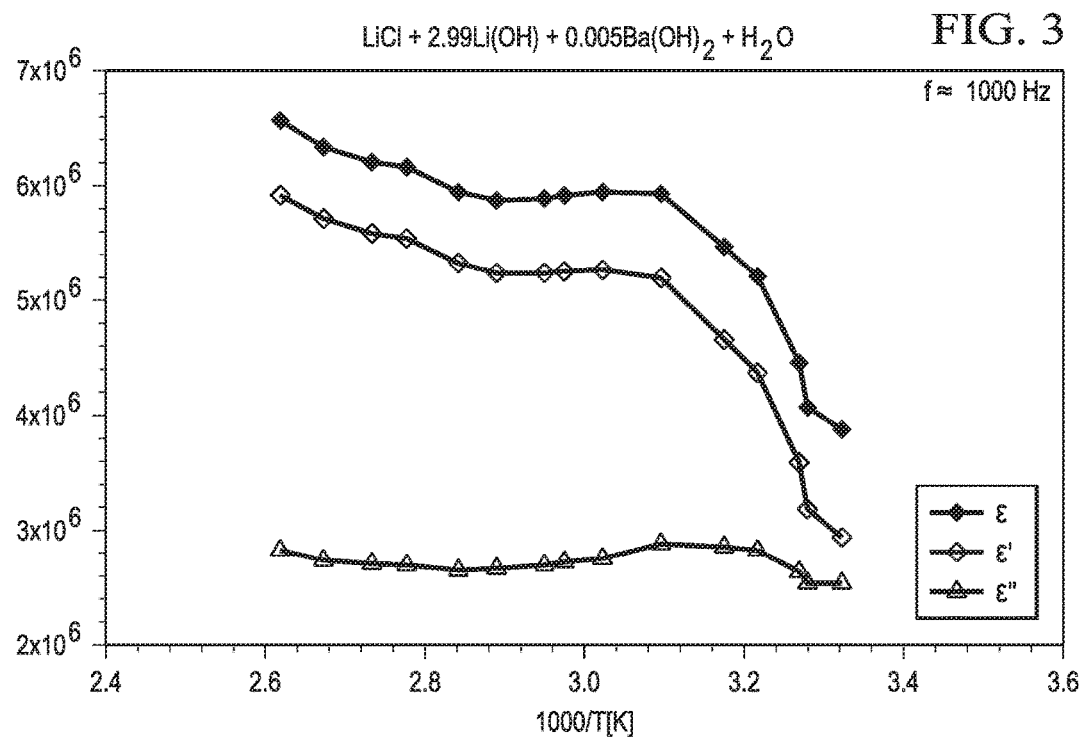
FIG. 3 is a graph showing the temperature dependence of the relative permittivity ($\in = \in' + i\in''$) measured in an ac field of frequency f=1000 Hz, of a Li-glass obtained from a precursor composition of nominal $Li_{2.9}Ba_{0.005}ClO$. $\in'$ is the dielectric constant.
Figure 6:
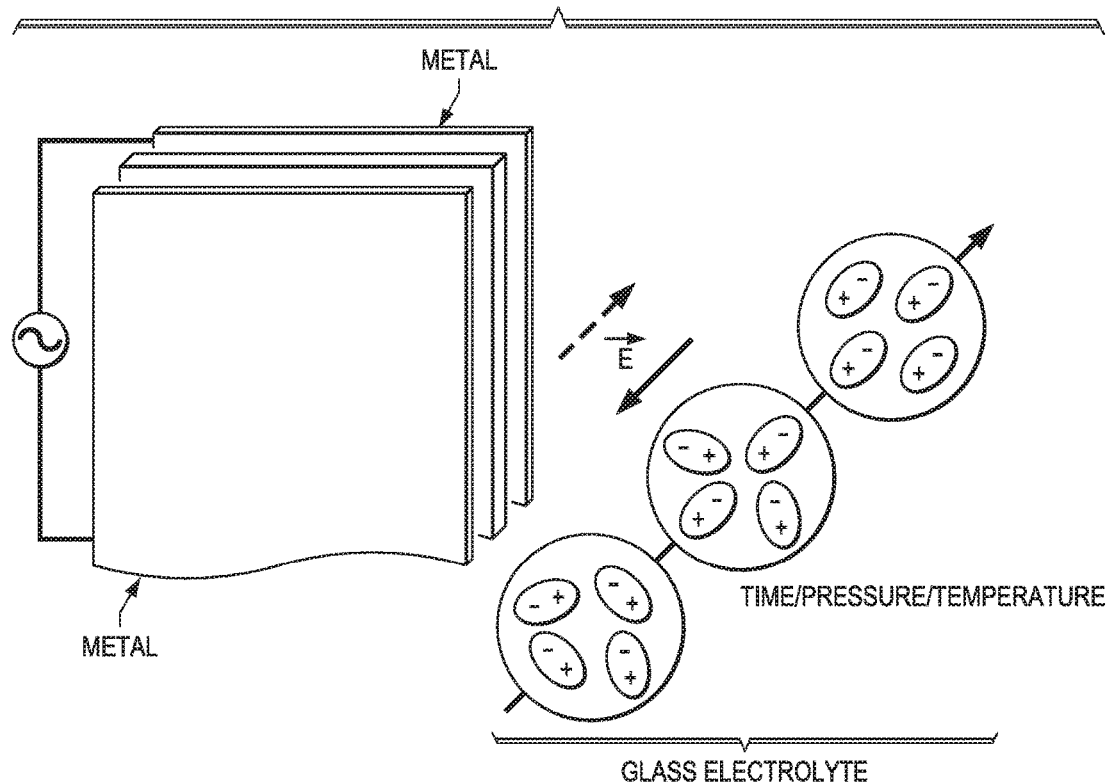
FIG. 6 is a schematic diagram of the ordering with time, pressure, and/or temperature of electric dipoles in an ac or dc electric field.

In one example, the constituent precursors of the crystalline material $Li_{3-x}H_xOCl$ contained an added 0.005 Barium oxide (BaO) per formula unit. Hydrogen chloride (HCl) gas left the solid during a moderate-temperature anneal of the water-solvated glass/amorphous solid. Hydroxide ($OH^-$) anion conductivity was also observed, but was much smaller than lithium ion ($Li^+$) conductivity, and above 230° C., a weight loss signaled the occurrence of the reaction $2(OH)^-=O^{2-}+H_2O\uparrow$ as a result of the evaporation of the water ($H_2O$). FIG. 1 illustrates lithium ion ($Li^+$) conductivity as a function of temperature in an Arrhenius plot for this material. FIG. 3 presents the variation of the dielectric constant of this material with temperature.

Figure 2:
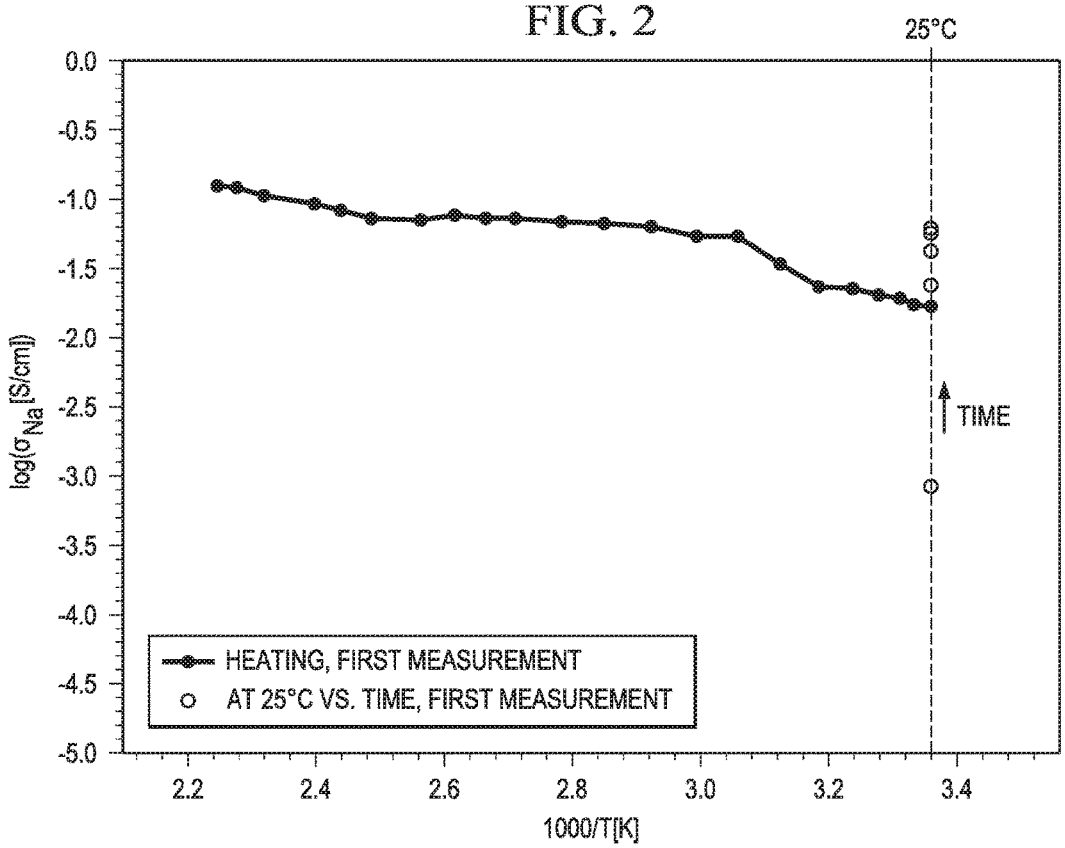
FIG. 2 is a graph showing the dependence on temperature, closed circles, and time at 25° C., open circles, of the $Na^+$ conductivity, $\sigma_{Na}$, of a Na-glass.

FIG. 2 illustrates sodium ion ($Na^+$) conductivity as a function of temperature in an Arrhenius plot for a water-solvated glass/amorphous solid in which sodium (Na) replaced (Li) in the constituent precursor for $Na_{3-x}H_xOCl$ to which 0.005 Barium oxide (BaO) per formula unit was added. Hydrogen chloride (HCl) gas left the solid during a moderate-temperature anneal of the water-solvated glass/amorphous solid. Hydroxide $(OH^-)^-$ conductivity was also observed, but was much smaller than the sodium ion ($Na^+$) and above 230° C., a weight loss signaled the reaction $2(OH)^- = O^{2-} + H_2O\uparrow$ which dried completely the glass/amorphous products.

Water-solvated glass/amorphous solid sodium-ion ($Na^+$) and lithium-ion ($Li^+$) conductors have been used to plate reversibly metallic sodium (Na) or metallic lithium (Li) onto itself without dendrites over 1000 times, thereby proving that a dry water-solvated glass/amorphous solid can be used in a rechargeable sodium-ion or lithium-ion battery and that similar dry materials can be used in other batteries or water-sensitive devices.

(2) $KH_2PO_4$ is a crystalline ferroelectric in which the protons ($H^+$) are trapped in hydrogen bonds. However, $BaKPO_4$ is a crystalline electronic insulator containing large barium ions ($Ba^{2+}$) and potassium ions ($K^+$) ions that can stabilize hydroxide polyanions if exposed to water vapor. Solvation of water into this solid creates a water-solvated glass/amorphous solid that is a fast $H^+$ conductor and an electronic insulator.

Figure 4A:
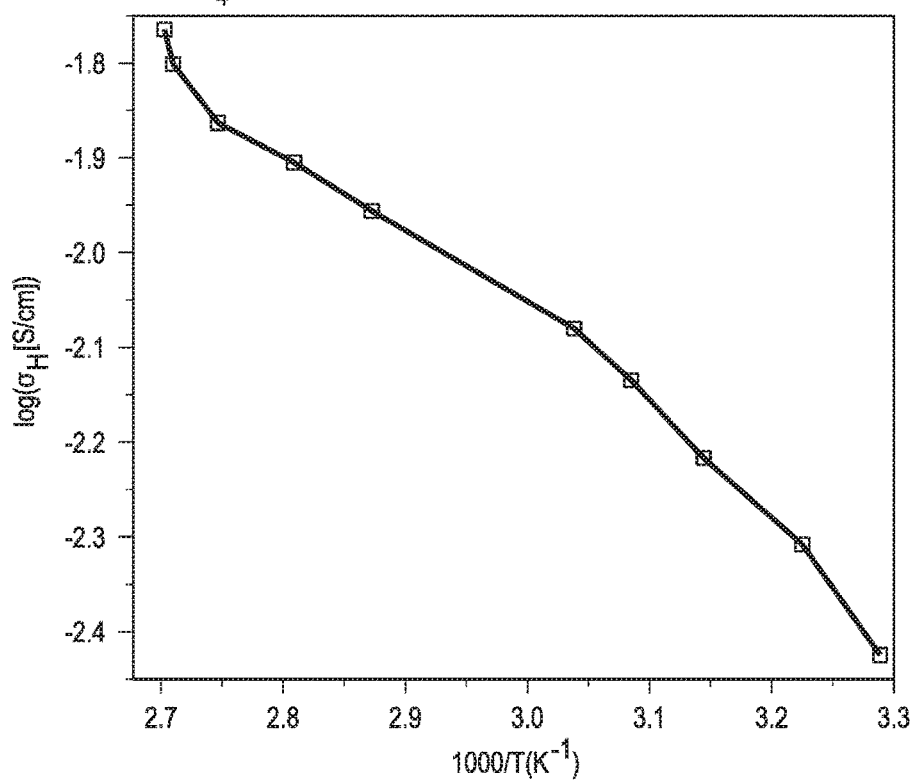
FIG. 4A is an Arrhenius plot showing the temperature dependence of the proton ($H^+$) conductivity ($\sigma_H$) of a proton electrolyte solid obtained by solvating water in $BaKPO_4$.
Figure 4B:
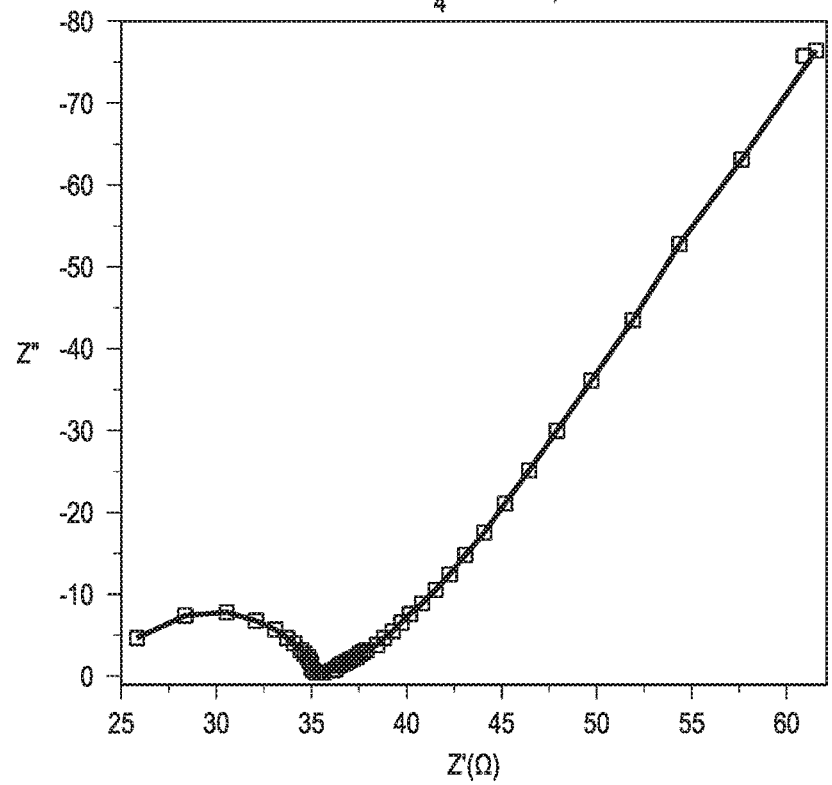
FIG. 4B is a graph showing a representative Nyquist plot taken at 25° C. of the frequency dependence of $\sigma_H$ of a proton electrolyte; the impedance is $Z=Z'+iZ''$.
Figure 7:
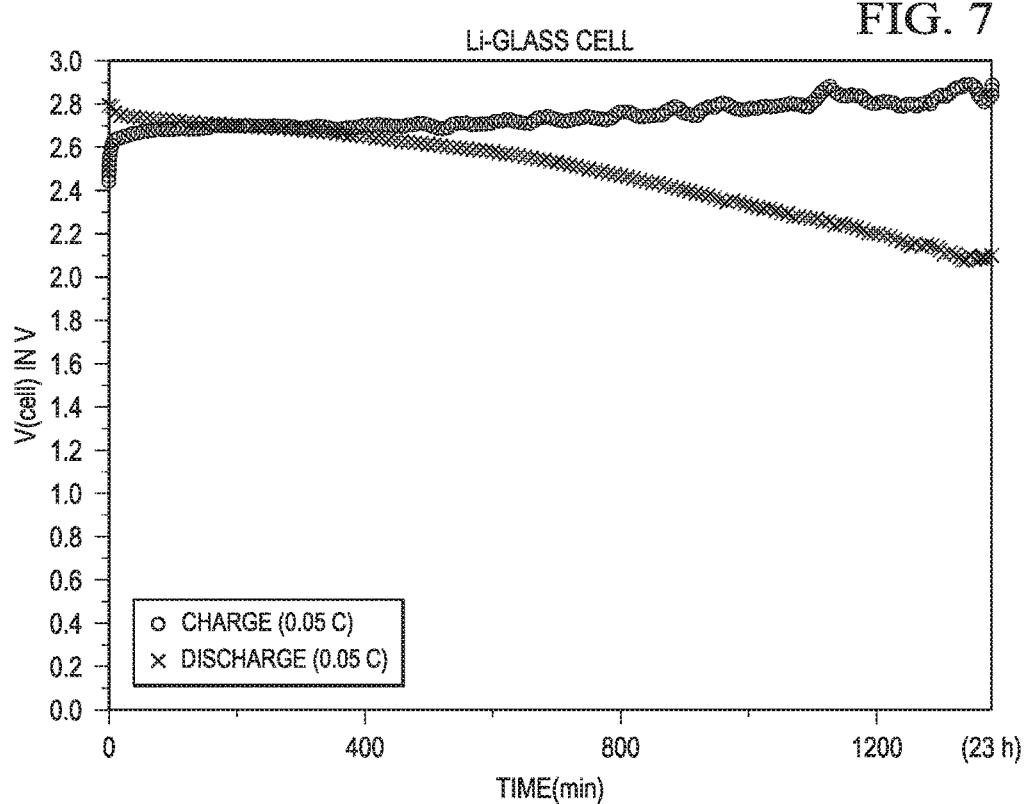
FIG. 7 is a graph showing charge/discharge curves of a full lithium cell showing plating/stripping of a metallic lithium anode from a Li-glass electrolyte.
Figure 8:
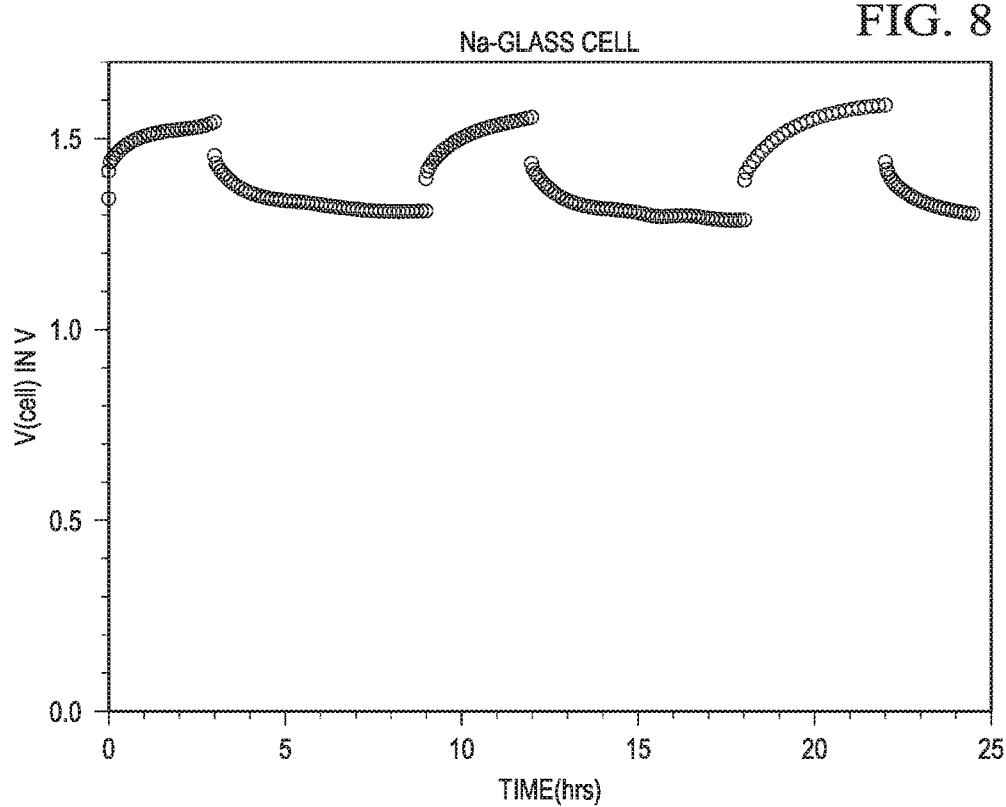
FIG. 8 is a graph showing charge/discharge voltages of a full sodium cell showing plating/stripping of a metallic-sodium anode from a Na-glass electrolyte.

FIG. 4 presents an Arrhenius plot of the proton ($H^+$) conductivity of the water-solvated glass/amorphous solid derived from $BaKPO_4$ by exposure to water vapor at 80° C. Note that the proton conductivity is $\sigma_H = 10^{-2}$ S $cm^{-1}$ at a $T \approx 75°$ C., which makes it possible to use it as a replacement for a NAFION membrane in a room-temperature fuel cell or a rechargeable battery with a redox-couple flow-through liquid electrode.

Electrolytes

The magnitude of the ionic conductivity of an electrolyte in an electrochemical cell dictates the thickness and area of the electrolyte separating the two electrodes for a desired output current I. The energy difference $E_g$ between the lowest unoccupied molecular orbital (LUMO) and the highest occupied molecular orbital (HOMO) of the electrolyte dictates the highest voltage V for stable operation of a cell. Therefore, the electric power on charge and discharge, $P_{ch} = I_{ch}V_{ch}$ and $P_{dis} = I_{dis}V_{dis}$, depends critically on the electrolyte as also does the efficiency of storage of electrical energy, 100 $P_{dis}/P_{ch}$%. The voltages of a cell are $$V_{ch} = V_{oc}\eta_{ch}(I_{ch}) \text{ and } V_{dis} = V_{oc} - \eta_{dis}(I_{dis}) \quad (1)$$

where the voltage at open electronic circuit is $V_{oc} = (\mu_A - \mu_C)/e$; the $\mu_A$ and $\mu_C$ are, respectively, electrochemical potentials of the anode and the cathode, and e is the magnitude of the electronic charge.

The $\eta_{ch}$ and $\eta_{dis}$ are called, respectively, the overvoltage and the polarization. The $\eta(q) = IR_{cell}$ depend on the resistances $R_{cell} = R_{el} + R_{ct}$; $R_{el}$ is the resistance to the ionic conductivity $\sigma_i = n_i q_i \mu_i$ in the electrolyte and $R_{ct}$ is the resistance to ionic transport across any electrode/electrolyte interfaces. The mobility $\mu_i = v/E$ is the velocity of the ion in an applied electric field E. The $R_{ct}$ at the anode and the cathode interface with the electrolyte are different from one another and the charge transport across an interface is also different between charge and discharge, so $\eta_{ch} \neq \eta_{dis}$.

The capacity of a rechargeable battery is the amount of charge per unit weight or volume passed between the electrodes during a complete reaction at a constant current I=dq/dt:

$$Q(I) = \int_0^{\Delta t} I dt = \int_0^{Q(I)} dq \quad (2)$$

An irreversible capacity loss in a charge/discharge cycle, i.e. a $\Delta t_{dis}(n+1) < \Delta t_{dis}(n)$, where (n+1) and n are cell cycle numbers, represents a capacity fade with cycling. The coulombic efficiency of the cell $100\Delta t_{dis}(n+1)/\Delta t_{dis}(n)$ % is a measure of the cycle life before a rechargeable battery capacity fades to 80% of its original capacity.

The energy density of a rechargeable battery is $$\Delta E = \int_0^{\Delta t} IV dt = \int_0^{Q(I)} V(q) dq = <V(q)> Q(I) \quad (3).$$

where Q(I) is the capacity at a current I defined by equation (2).

For a given chemical reaction between the two electrodes of a rechargeable electrochemical cell, a small $R_{el}$ requires a thin electrolyte with a sufficient density $n_i$ of mobile working ions carrying a charge $q_i$ with a high mobility $\mu_i$. The electronic conductivity of a highly conductive metal is orders of magnitude greater than any electrolyte ionic conductivity $\sigma_i = n_i q_i \mu_i$, so rechargeable batteries are typically fabricated with a thin electrolyte between electronically conducting electrodes that have a large area, but the electrodes need not-have a high electronic conductivity so long as they are not too thick and make electronic contact to a large-area, metallic current collector.

The $R_{ct}$ can be made small across a solid/liquid interface, but it is increased where a mismatch between the $\mu_A$ or of a solid electrode and the LUMO or HOMO of a liquid electrolyte requires formation of a passivating solid-electrolyte-interphase (SEI) layer that must allow transfer of the working ion across it also. For gaseous reactants at a solid-electrolyte surface, $R_{ct}$ may be low if it is accompanied by a high catalytic activity for the dissociation of the gas and its chemisorption into the electrolyte or the extraction of the gas from the electrolyte. A low $R_{ct}$ across a solid/solid interface is also critical. Even at an alkali-metal anode where plating only changes the electrode dimension perpendicular to the interface, a soft polymer interface layer that is chemically stable on contact with the two solids may be useful to maintain a long cycle life. If the electrode includes small particles into which the working ion is inserted, displaces an atom, or forms an alloy, the particle changes volume. This volume change normally prevents the solid/solid interface from being maintained during cycling. This problem occurs even if the solid electrolyte is made into a paste or a melt during fabrication to wet all the surfaces of the electrode particles. This problem limits the battery capacity and cycle life of previous all-solid-state batteries. However, realization of reversible plating of an alkali metal across the solid/solid alkali-metal/-glass electrolyte interface allows optimization of the cell voltage for a given cathode and eliminates losses associated with an anode SEI layer. Moreover, a solid electrolyte blocks soluble species of a liquid redox-molecule flow-through cathode or soluble intermediates of a sulfur cathode from reaching the anode. However, traditional solid electrolytes, whether glassy, amorphous, or crystalline, do not have the ionic conductivity needed to allow their use at ambient temperature unless they are so thin that they need to be supported by a porous substrate or sandwiched between polymer-electrolyte membranes, and the early report of a glass formed from a crystalline lithium conductor did not demonstrate why it could be dry or what ionic species was the dominant conductor. Moreover, it would be impossible to plate an alkali metal on a copper current collector across the solid/solid interface in the presence of liquid water in the electrolyte.

Since the water-solvated glass/amorphous solids obtained in this disclosure have a LUMO>$E_F$(Li) and are stable in organic liquid, ionic liquid, and/or polymer electrolytes, they may be used with a liquid catholyte and/or polymer located between the solid electrolyte and the cathode and/or with a passivating solid-electrolyte interphase (SEI) layer and/or polymer between the anode and the solid electrolyte. The dry water-solvated glass/amorphous electrolytes of this disclosure open up the possibility of using rechargeable batteries with a variety of cathodes: conventional reversible insertion-compound solid cathodes, redox flow-through liquid cathodes, gaseous air cathodes, and solid sulfur cathodes. The use of a solid lithium-ion (Li$^+$) or sodium-ion (Na$^+$) electrolyte also allows a choice of a variety of electrochemical cells, including fuel cells, electrolysis cells, and capacitor cells as well as rechargeable battery cells.

The water-solvated glass/amorphous solid proton electrolytes formed by exposing crystalline BaKPO$_4$ to water vapor can replace the NAFION membrane in an ambient temperature fuel cell.

Rechargeable batteries containing a water-solvated glass/amorphous solid electrolyte described herein can provide a safe, low-cost stationary battery capable of storing a large amount of electrical energy for feeding the grid or charging the battery or capacitor of an electric vehicle since the temperature range of operation of a stationary battery can be kept small through all seasons at little cost. The small activation energy for alkali-ion transport in the electrolyte can also make feasible an electric vehicle powered by a portable rechargeable battery that operates in a wide range of ambient temperatures.

Dielectrics

The water-solvated glass/amorphous solids described herein provide huge dielectric constants that can be used in capacitors or other devices where there is no ionic transport across the solid/solid interface of a metallic electrode and the solid electrolyte. The mobile ions move to the interfaces to create an electric-double-layer capacitor and the electric dipoles in the solid are free to rotate to add their dipole moment to the dielectric constants. The temperature dependence of the dielectric constants are the same as or similar to those shown in FIG. 3.

Capacitors, like batteries, store electrical energy; but unlike a rechargeable battery or a reversible fuel cell, the energy is stored as the electrostatic energy between electrons or electron holes in the metallic plates of a capacitor and dipoles or mobile ions in a solid electrolyte that separates the two metallic plates. In a double-layer electrochemical capacitor, mobile cations in the electrolyte attract electrons to one plate and mobile and/or static anions attract electron holes to the opposing plate. The mobile ions of the electrolyte are trapped by the electrons or electron holes in the metallic plates as long as the charging external circuit is opened, preventing the electrons and electron holes created by charging from recombining. However, on closing the electronic circuit, the electrons recombine quickly, thereby releasing ion flow and dipole rotation in the electrolyte dielectric. FIG. 5 illustrates the charge/discharge cycling of a capacitor formed by sandwiching a thick water-solvated glass/amorphous solid between two aluminum plates. In the absence of carbon, the thin aluminum oxide (Al$_2$O$_3$) layer on the surface of the aluminum plates blocks charge transfer across the solid/solid interface to up to a 10 V charge. On discharge, there are three regions versus time, one within a second that was too fast to be recorded, one over one to three seconds that was slow enough to be recorded with the apparatus used, and a slow third that lasts for several minutes. The fastest presumably reflects electron transport between trapped electrons in the anode and electron holes in the cathodes, the intermediate discharge the movement of cations away from the interfaces resulting from the loss of trapped electron charge, and the slow discharge any reorientation or diffusion of the electric dipoles.

Ionic Conductors

Electronic conduction controls electronic devices. However, nature uses ionic conduction and redox energies to accomplish many things. The water-solvated glass/amorphous solids of the present disclosure may be used in devices, methods, and systems that utilize both ionic and electronic conduction. For instance, the trapping of electrons and/or electron holes at metal/electrolyte interfaces may be used in an electronic memory or switch. Exploration of the wedding of electrochemistry and electronic devices remains a relatively unexplored domain.

According to a first embodiment, A, the disclosure provides a method of forming a dried, water-solvated glass/amorphous solid. The method includes transforming a crystalline, sodium ion (Na$^+$) or lithium-ion (Li$^+$) electronic insulator or its constituent precursors comprising at least one Na$^+$ or Li$^+$ bonded to oxygen (O), hydroxide (OH), and/or to at least one halide into a water-solvated glass/amorphous Na$^+$ or Li$^+$ ion-conducting solid by adding water in an amount less than or equal to the water solvation limit of the glass/amorphous solid.

In further embodiments, which may be combined with embodiment A and with one another unless clearly mutually exclusive, i) the method further includes adding a glass-forming oxide, sulfide, or hydroxide and heating to expel volatile constituents; ii) the crystalline, electronic insulator or its constituent precursors include a material with the general formula A$_{3-x}$H$_x$OX, wherein 0≤x≤1, A is the at least one alkali metal, and X is the at least one halide; iii) the crystalline, electronic insulator or its constituent precursors includes a glass-forming additive comprising at least one of an oxide, a hydroxide, and/or a sulfide; iv) the glass-forming additive includes at least one of Ba(OH)$_2$, Sr(OH)$_2$, Ca(OH)$_2$, Mg(OH)$_2$, Al(OH)$_3$, or BaO, SrO, CaO, MgO, Al, B$_2$O$_3$, Al$_2$O$_3$, SiO$_2$, S and/or Li$_2$S; v) the additive includes at least two of an oxide, a hydroxide, and/or a sulfide; vi) the additive includes at least two of Ba(OH)$_2$, Sr(OH)$_2$, Ca(OH)$_2$, Mg(OH)$_2$, Al(OH)$_3$, or BaO, SrO, CaO, MgO, Al, B$_2$O$_3$, Al$_2$O$_3$, SiO$_2$, S and/or Li$_2$S; vii) the dried, water-solvated glass/amorphous solid includes less than 2 mole percent of the glass-forming additive; viii) the additive adjusts the glass transition temperature T$_g$ of the water-solvated glass/amorphous solid; ix) the at least one halide includes chlorine (Cl), bromine (Br) and/or iodine (I); x) at least a portion of the at least one halide exits the water-solvated glass/amorphous solid as a hydrogen halide gas; and xi) the hydroxide reacts to form H$_2$O that exits the water-solvated glass/amorphous solid as gaseous H$_2$O.

According to a second embodiment, B, the disclosure provides a method of forming an H$^+$-conductive water-solvated electrolyte. The method includes transforming a crystalline material comprising at least one alkali and/or alkaline-earth cation bonded to at least one acidic polyanion into a glass/amorphous solid by adding water in an amount less than or equal to its solvation limit in the crystalline material such that water dissociates into hydroxide (OH)$^-$ anions that coordinate to the cations to form polyanions and the water also dissociates into protons (H$^+$) that are mobile in a framework of an acidic oxide and the polyanions.

According to a third embodiment, C, the disclosure provides a method of forming a water-solvated glass/amorphous solid. The method includes transforming a crystalline electronic insulator comprising at least one acidic polyanion and at least one cation into a water-solvated glass/amorphous proton (H$^+$)-conducting solid by adding water in an amount less than or equal to the water solvation limit of the crystalline electronic insulator In further embodiments, which may be combined with embodiments B or C, and with one another unless clearly mutually exclusive: i) wherein the acidic polyanion includes $(SO_4)^{2-}$ and/or $(PO_4)^{3-}$ and/or $(SiO_4)^{4-}$ polyanion; ii) the at least one cation is stabilized in the form of at least one stable hydroxide polyanion; iii) the at least one cation includes a barium (Ba$^{2+}$) ion, a potassium (K$^+$) ion, a rubidium (Rb$^+$) ion, and/or a cesium (Cs$^+$) ion; iv) the stable hydroxide polyanion includes $(Ba(OH)_x)^{2-x}$, $(K(OH)_x)^{1-x}$, $(Rb(OH)_x)^{1-x}$ and/or $(Cs(OH)_x)^{1-x}$.

According to a fourth embodiment, D, the disclosure provides a water-solvated glass/amorphous solid formed from the method of any of the above embodiments. The disclosure further provides, in additional embodiments, electrolytes and dielectrics including this water-solvated glass/amorphous solid According to a fifth embodiment, E, the disclosure provides a paste or slurry including the dried water-solvated glass/amorphous solid of embodiment D, wherein the paste or slurry includes particles of the water-solvated glass/amorphous solid in an organic liquid, an ionic liquid, and/or a polymer. According to a further embodiment, the paste or slurry may be applied to a large surface area by painting, doctor-blading, vapor deposition, or printing.

According to a sixth embodiment, F, the disclosure provides a method of forming an electrolyte or dielectric by applying the paste or slurry of embodiment E to a surface. In further embodiments, the organic liquid, ionic liquid, and/or polymer may be allowed to evaporate totally or in part, leaving an electrolyte or dielectric, or the organic liquid, ionic liquid, and/or polymer may not be allowed to evaporate.

According to a seventh embodiment, G, the disclosure provides a battery including a material as described above. The battery may also include a liquid electrolyte, a polymer electrolyte, or a mixture thereof, wherein the liquid or polymer electrolyte contacts at least one electrode in the battery.

According to an eighth embodiment, H, the disclosure provides a cell for storing electrical energy including a faradaic and a non-faradaic component including an electrolyte material as described above.

According to a ninth embodiment, I, the disclosure provides a capacitor including a material as described above. The capacitor may include two electrodes formed from the same metal or metal alloy, or it may include two electrodes formed from two different metals or metal alloys having two different Fermi energies.

According to a tenth embodiment, J, the disclosure provides a fuel cell including a material as described above. The fuel cell may be reversible.

According to an eleventh embodiment, K, the disclosure provides an electrolysis cell including an electrolyte or separator including a material as described above. The electrolysis cell may produce hydrogen gas (H$_2$) from water.

According to a twelfth embodiment, L. the disclosure provides an electrochemical device including a reversible fuel cell of embodiment J and a chemical storage bed.

According to a thirteenth embodiment, M, the disclosure provides an electronic device including a material as described above. According to further embodiments, which may be combined with one another: i) the electronic device includes a memory, a transistor, a switch, or a sensor including a material as described above; ii) the electronic device uses a piezoelectric effect of a material as described above; iii) the electronic device uses a pyroelectric effect of a material as described above.

According to a fourteenth embodiment, N, the disclosure provides a device that transforms heat into electric power at a fixed temperature using a material as described above Although only exemplary embodiments of the disclosure are specifically described above, it will be appreciated that modifications and variations of these examples are possible without departing from the spirit and intended scope of the disclosure. For instance, numeric values expressed herein will be understood to include minor variations and thus embodiments "about" or "approximately" the expressed numeric value unless context, such as reporting as experimental data, makes clear that the number is intended to be a precise amount. In addition, the water-solvated glass/amorphous solids may be used in batteries and capacitors and other electrical or electrochemical devices having components and properties that are otherwise known and that are described in the background.

The invention claimed is:

1. A method of forming a dried, water-solvated glass/amorphous solid, the method comprising:
    transforming a crystalline sodium-ion (Na$^+$) or lithium-ion (Li$^+$) electronic insulator or its constituent precursors comprising at least one Na$^+$ or Li$^+$ bonded to oxygen (O), hydroxide (OH), and/or to at least one halide into a water-solvated glass/amorphous Na$^+$ or Li$^+$ ion-conducting solid having a water solvation limit by adding water in an amount less than or equal to the water solvation limit of the glass/amorphous solid;
    heating the water-solvated glass/amorphous Na$^+$ or Li$^+$ ion-conducting solid in an alternating current (ac) or a direct current (dc) electric field to orient dipoles present in the water-solvated glass/amorphous Na$^+$ or Li$^+$ ion-conducting solid; and
    cooling the water-solvated glass/amorphous Na$^+$ or Li$^+$ ion-conducting solid to room temperature such that dipoles present in the water-solvated glass/amorphous Na$^+$ or Li$^+$ ion-conducting solid remain oriented.

2. The method of claim 1, further comprising adding a glass-forming oxide, sulfide, or hydroxide and heating to expel volatile constituents.

3. The method of claim 1, wherein the crystalline, electronic insulator or its constituent precursors comprise a material with the general formula $A_{3-x}H_xOX$, wherein $0 \leq x \leq 1$, A is the at least one Na$^+$ or Li$^+$, and X is the at least one halide.

4. The method of claim 1, wherein the crystalline, electronic insulator or its constituent precursors comprises a glass-forming additive comprising at least one of an oxide, a hydroxide, and/or a sulfide.

5. The method of claim 4, wherein the glass-forming additive comprises at least one of Ba(OH)$_2$, Sr(OH)$_2$, Ca(OH)$_2$, Mg(OH)$_2$, Al(OH)$_3$, or BaO, SrO, CaO, MgO, AlO, B$_2$O$_3$, Al$_2$O$_3$, SiO$_2$, S and/or Li$_2$S.

6. The method of claim 5, wherein the additive comprises at least two of $Ba(OH)_2$, $Sr(OH)_2$, $Ca(OH)_2$, $Mg(OH)_2$, $Al(OH)_3$, or BaO, SrO, CaO, MgO, AlO, $B_2O_3$, $Al_2O_3$, $SiO_2$, S and/or $Li_2S$.

7. The method of claim 4, wherein the additive comprises at least two of an oxide, a hydroxide, and/or a sulfide.

8. The method claim 4, wherein the dried, water-solvated glass/amorphous solid comprises less than 2 mole percent of the glass-forming additive.

9. The method of claim 4, wherein the additive adjusts the glass transition temperature $T_g$ of the water-solvated glass/amorphous solid.

10. The method of claim 1, wherein the at least one halide comprises chlorine (Cl), bromine (Br) and/or iodine (I).

11. The method of claim 1, wherein at least a portion of the at least one halide exits the water-solvated glass/amorphous solid as a hydrogen halide gas.

12. The method of claim 1, wherein the hydroxide reacts to form $H_2O$ that exits the water-solvated glass/amorphous solid as gaseous $H_2O$.

13. The method of claim 1, further comprising heating the water-solvated glass/amorphous $Na^+$ or $Li^+$ ion-conducting solid to dry the water-solvated glass/amorphous $Na^+$ or $Li^+$ ion-conducting solid prior to heating the water-solvated glass/amorphous $Na^+$ or $Li^+$ ion-conducting solid in an alternating current (ac) or a direct current (dc) electric field.

14. The method of claim 13, wherein heating the water-solvated glass/amorphous $Na^+$ or $Li^+$ ion-conducting solid to dry the water-solvated glass/amorphous $Na^+$ or $Li^+$ ion-conducting solid comprises heating to a temperature of at least 230° C.

15. The method of claim 1, wherein heating the water-solvated glass/amorphous $Na^+$ or $Li^+$ ion-conducting solid comprises heating to a temperature between 50° C. and 110° C.

16. The method of claim 1, wherein the water-solvated glass/amorphous $Na^+$ or $Li^+$ ion-conducting solid has a higher cation conductivity at room temperature than an otherwise identical material that is not heated in an alternating current (ac) or a direct current (dc) electric field.

* * * * *

UNITED STATES PATENT AND TRADEMARK OFFICE
CERTIFICATE OF CORRECTION

PATENT NO. : 9,890,048 B2  
APPLICATION NO. : 15/178228  
DATED : February 13, 2018  
INVENTOR(S) : John B. Goodenough et al.

Page 1 of 1

It is certified that error appears in the above-identified patent and that said Letters Patent is hereby corrected as shown below:

On the Title Page

Under (72) Inventors:
Delete "Preetam Singh, Austin, TX (US)"

Signed and Sealed this
Fourth Day of December, 2018

Andrei Iancu
*Director of the United States Patent and Trademark Office*